US009483505B2

(12) United States Patent
Crossley et al.

(10) Patent No.: US 9,483,505 B2
(45) Date of Patent: Nov. 1, 2016

(54) VERSIONING FOR CONFIGURATIONS OF REUSABLE ARTIFACTS

(71) Applicant: International Business Machines Corporation, Armonk, NY (US)

(72) Inventors: Nicholas D. J. Crossley, Costa Mesa, CA (US); Troy R. Dugger, Keller, TX (US); David J. Honey, Crookham Village (GB); Samuel Sung-Ok Lee, Irvine, CA (US); Schuyler B. Matthews, Cary, NC (US); Darcy L. Wiborg Weber, Mission Viejo, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 265 days.

(21) Appl. No.: 13/837,559

(22) Filed: Mar. 15, 2013

(65) Prior Publication Data

US 2014/0279974 A1     Sep. 18, 2014

(51) Int. Cl.
*G06F 17/30*     (2006.01)
*G06F 17/00*     (2006.01)

(52) U.S. Cl.
CPC ............... *G06F 17/30309* (2013.01)

(58) Field of Classification Search
CPC ........ G06F 8/71; G06F 8/65; G06F 2201/84; G06F 17/30233; G06F 12/0246; G06F 17/30067; G06F 17/30088; G06F 17/30197; G06F 11/1471; G06F 2201/815; G06F 2212/7202; G06F 8/75; G06F 11/1076; G06F 11/1435; G06F 11/1464; G06F 11/2023; G06F 11/205

USPC ......................................................... 707/695
IPC ............................................. G06F 17/30,17/00
See application file for complete search history.

(56) References Cited

U.S. PATENT DOCUMENTS

| | | | |
|---|---|---|---|
| 5,649,200 | A | 7/1997 | Leblang et al. |
| 5,805,889 | A | 9/1998 | Van De Vanter |
| 5,881,292 | A | 3/1999 | Sigal et al. |

(Continued)

FOREIGN PATENT DOCUMENTS

| | | |
|---|---|---|
| JP | 2007226376 A | 9/2000 |
| JP | 2007128450 | 5/2007 |

(Continued)

OTHER PUBLICATIONS

Vieira, M. et al., "Integrating GQM and Data Warehousing for the Definition of Software Reuse Metrics", In Software Engineering Workshop (SEW), 2011 34th IEEE, pp. 112-116, IEEE, 2011.

(Continued)

*Primary Examiner* — Yicun Wu
(74) *Attorney, Agent, or Firm* — Cuenot, Forsythe & Kim, LLC (57) ABSTRACT

Arrangements described herein relate to versioning configurations of reusable artifacts. An artifact baseline corresponding to the present version of a first artifact can be created. Responsive to creating that artifact baseline, the present version of the first artifact, and present versions of children artifacts of the present version of the first artifact, are made immutable. Responsive to identifying a change to the present version of the first artifact, a new version of the first artifact can be automatically created, wherein the new version of the first artifact is mutable.

14 Claims, 5 Drawing Sheets

(56) References Cited

U.S. PATENT DOCUMENTS

| | | | |
|---|---|---|---|
| 6,021,415 | A | 2/2000 | Cannon et al. |
| 6,460,052 | B1 * | 10/2002 | Thomas et al. ............... 707/695 |
| 6,681,382 | B1 | 1/2004 | Kakumani et al. |
| 6,904,454 | B2 | 6/2005 | Stickler |
| 7,085,768 | B2 | 8/2006 | Scott et al. |
| 7,322,024 | B2 | 1/2008 | Carlson et al. |
| 7,322,025 | B2 | 1/2008 | Reddy et al. |
| 7,587,568 | B2 | 9/2009 | Muthulingam et al. |
| 7,631,006 | B2 | 12/2009 | Hagstrom et al. |
| 7,644,392 | B2 | 1/2010 | Geipel et al. |
| 7,895,563 | B2 | 2/2011 | Carlson et al. |
| 8,122,067 | B2 | 2/2012 | Scott et al. |
| 8,175,936 | B2 | 5/2012 | Ronen et al. |
| 8,230,387 | B2 | 7/2012 | Srivastava et al. |
| 8,909,875 | B1 * | 12/2014 | Ostapovicz ........... G06F 3/0608 711/108 |
| 9,223,813 | B2 | 12/2015 | Crossley et al. |
| 9,268,805 | B2 | 2/2016 | Crossley et al. |
| 9,275,089 | B2 | 3/2016 | Crossley et al. |
| 2003/0033590 | A1 | 2/2003 | Leherbauer |
| 2003/0115223 | A1 | 6/2003 | Scott et al. |
| 2003/0208490 | A1 | 11/2003 | Larrea et al. |
| 2006/0282480 | A1 | 12/2006 | Johnson et al. |
| 2006/0288054 | A1 | 12/2006 | Johnson et al. |
| 2007/0255765 | A1 | 11/2007 | Robinson |
| 2007/0265862 | A1 | 11/2007 | Freund et al. |
| 2008/0133558 | A1 | 6/2008 | Carlson et al. |
| 2008/0320496 | A1 | 12/2008 | Barinov et al. |
| 2009/0083268 | A1 | 3/2009 | Coqueret et al. |
| 2009/0171971 | A1 | 7/2009 | Goddard et al. |
| 2010/0153912 | A1 | 6/2010 | Porras et al. |
| 2010/0153917 | A1 | 6/2010 | Kramer et al. |
| 2011/0010687 | A1 | 1/2011 | Plante |
| 2011/0167042 | A1 | 7/2011 | Moore, Jr. et al. |
| 2012/0054219 | A1 | 3/2012 | Narendra et al. |
| 2012/0096425 | A1 | 4/2012 | Gupta et al. |
| 2015/0046415 | A1 | 2/2015 | Crossley et al. |
| 2015/0074067 | A1 | 3/2015 | Crossley et al. |
| 2015/0074643 | A1 | 3/2015 | Crossley et al. |

FOREIGN PATENT DOCUMENTS

| | | |
|---|---|---|
| JP | 4786998 B2 | 10/2011 |
| WO | 2008133977 A1 | 11/2008 |

OTHER PUBLICATIONS

Babu, K.M., et al., "Searching Technique in Retrieving Software Reusable Components from a Repository", [Online] International Journal of Scientific and Research Publications, 2012 [retrieved Feb. 7, 2012], retrieved from the Internet: <http://www.ijsrp.org/research_paper_feb2012/ijsrp-feb-2012-23.pdf>, 3 pg.

White, J. et al., "Automating Product-Line Variant Selection for Mobile Devices", In Proc. of 11th Int'l. Software Product Line Conference (SPLC '07), IEEE © 2007, 10 pg.

"Performing Common Database Storage Tasks", [Online] In Oracle Databse 2 Day DBA 11g Release 1 (11.1) Part No. B28301-03 © 2004, 2008, Jul. 2007 [retrieved Sep. 20, 2012] retrieved from the Internet: <http://isu.ifmo.ru/docs/doc111/server.111/b28301/storage003.htm#BABHGIAG>, 10 pg.

"Reclaiming Unused Space in Datafiles", [Online] Oracle-Base, ORACLE-BASE.com © 2000, 2013 [retrieved Aug. 8, 2013], retrieved from the Internet: <www.oracle-base.com/articles/misc/reclaiming-unused-space.php>, 7 pg.

"StarTeam Best Practices—The StarTeam Model", [Online] Fox Consult © 1993-2013 [retrieved Aug. 8, 2013], <http://www.foxdata.com/starteam/best_practices/the_starteam_model.htm>, 28 pg.

Van Gurp, J.,"Variability in Software Systems: The Key to Software Reuse" [Online] Licentiate Theses, University of Groningen, Sweden, Oct. 2000, 194 pg.

Beuche, D., "What's the difference? A Closer Look at Configuration Management for Product Lines" [Online] Product Line Engineering Blog, Mar. 13, 2010 [retrieved Aug. 8, 2013], retrieved from the Internet: <http://productlines.wordpress.com/2010/03/13/whats-the-difference-a-closer-look-at-configuration-management-for-product-lines/>, 4 pg.

Holtman, K. et al., "RFC 2296—HTTP Remote Variant Selection Algorithm—RSVA/1.0", [Online] Network Working Group, Mar. 1998 [retrieved Aug. 8, 2013], retrieved from the Internet: <http://tools.ietf.org/html/rfc2296>, 14 pg.

"Variant Selection Criteria", [Online] IBM Mobile Portal Accelerator, Multichannel Server, IBM Corp. [retrieved Jul. 31, 2013] <http://pic.dhe.ibm.com/infocenter/mpadoc/v6r1m0/index.jsp?topic=%2Fcom.volantis.mcs.eclipse.doc%2Fcomponents%2Fasset_selection_criteria.html>, 2 pg.

White, J. et al., "Automatically composing reusable software components for mobile devices", In Journal of Brazilian Computer Society, vol. 14, No. 1, Mar. 2008 [retrieved Aug. 8, 2013], retrieved from the Internet: <http://www.scielo.br/scielo.php?script=sci_arttext&pid=S0104-65002008000100004>, 26 pg.

Hopp, W. J. et al., "Product Line Selection and Pricing with Modularity in Design", In Manufacturing & Service Operations Mgmt., vol. 7, No. 3, Summer 2005, pp. 172-187.

Lucia, A.D. et al., "Recovering traceability links in software artifact management systems using information retrieval methods", ACM Transactions on Software Engineering and Methodology (TOSEM), vol. 16, No. 4, Art. 13, Sep. 2007, 50 pgs.

Novakouski, M. et al., "Best Practices for Artifact Versioning in Service-Oriented Systems", Carnegie Mellon Software Engineering Institute, Technical Note CMU/SEI-2011-TN-009, Jan. 2012, 42 pgs.

U.S. Appl. No. 14/022,884, Non-Final Office Action, Apr. 23, 2015, 10 pg.

U.S. Appl. No. 14/231,054, Non-Final Office Action, Apr. 23, 2015, 14 pg.

U.S. Appl. No. 14/523,400, Non-Final Office Action, Mar. 24, 2015, 8 pg.

U.S. Appl. No. 14/231,054, Notice of Allowance, Nov. 9, 2015, 10 pg.

Estublier, J. et al., "Impact of Software Engineering Research on the Practice of Software Configuration Management," ACM Trans. on Software Engineering and Methodology (TOSEM), vol. 14, No. 4, pp. 383-430, Oct. 2005, retrieved from the Internet: <http://dl.acm.org/citation.cfm?id=1101817>.

U.S. Appl. No. 14/022,884, Notice of Allowance, Oct. 23, 2015, 9 pg.

* cited by examiner

```
Create an artifact baseline corresponding to a present version of a first artifact
405
```
↓
```
Responsive to creating the first artifact baseline, by a processor, make the present
version of the first artifact, and present versions of children artifacts of the
present version of the first artifact, immutable
410
```
↓
```
Responsive to identifying a change to the present version of the first artifact, or a
change to at least one child artifact of the present version of the first artifact,
automatically create a new version of the first artifact, wherein the new version
of the first artifact is mutable
415
```
↓
```
Automatically create a new version for each parent artifact of the first artifact,
wherein the new version of each parent artifact is a mutable
420
```
↓
```
Responsive to a user input, make the new version of the first artifact immutable
425
```

VERSIONING FOR CONFIGURATIONS OF REUSABLE ARTIFACTS

BACKGROUND

Creating applications or systems from reusable components is common as a means to accelerate the delivery of solutions and reduce cost. Tracking the evolution of systems over time requires versioning, both for individual units of data and for configurations. The use of versioning provides the ability to view the history of individual units of data and compare any two versions of data to identify the changes between them, and the ability to view the history of a configuration to see how the data has changed over time. Today, the primary means of managing and tracking evolution of a system is via a configuration management system. A configuration management system requires a user to manually manage workspaces, and manually check out and check in data, assign new versions to the data, etc.

BRIEF SUMMARY

One or more embodiments disclosed within this specification relate to versioning configurations of reusable artifacts.

An embodiment can include a method of versioning configurations of reusable artifacts. The method can include creating an artifact baseline corresponding to a present version of a first artifact. The method also can include, responsive to creating the artifact baseline, by a processor, making the present version of the first artifact, and present versions of children artifacts of the present version of the first artifact, immutable. The method further can include, responsive to identifying a change to the present version of the first artifact, automatically creating a new version of the first artifact, wherein the new version of the first artifact is mutable.

Another embodiment can include a system having a processor. The processor can be configured to initiate executable operations including creating an artifact baseline corresponding to a present version of a first artifact. The executable operations also can include, responsive to creating the artifact baseline, making the present version of the first artifact, and present versions of children artifacts of the present version of the first artifact, immutable. The executable operations further can include, responsive to identifying a change to the present version of the first artifact, automatically creating a new version of the first artifact, wherein the new version of the first artifact is mutable.

Another embodiment can include a computer program product for versioning configurations of reusable artifacts. The computer program product can include a computer-readable storage medium having stored thereon program code that, when executed, configures a processor to perform a method including creating, by the processor, an artifact baseline corresponding to a present version of a first artifact. The method also can include, responsive to creating the first artifact baseline, by the processor, making the present version of the first artifact, and present versions of children artifacts of the present version of the first artifact, immutable. The method further can include, responsive to identifying a change to the present version of the first artifact, automatically creating, by the processor, a new version of the first artifact, wherein the new version of the first artifact is mutable.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to versioning configurations of reusable artifacts. A baseline for such artifacts can be established, which can cause such artifacts to be immutable. The baseline can include a version of a first artifact and versions of other artifacts that are children and/or parents of the first artifact. When the first artifact, or at least one of the children of the artifact, is changed, a new version of the artifact can be created. If a child artifact has changed, a new version of the child artifact also can be created. These versions can be mutable, at least until a new baseline is established.

The versioning can be supported with an object model that supports a containment relationship between various versions of the artifacts, and any version of an artifact can be reused. For example, a child artifact can be associated with any number of parent artifacts within an artifact hierarchy. When an artifact is made immutable, for example by establishing a new baseline, all children of the artifact also can be made immutable, for example from a point in the hierarchy representing the artifact down through the children of the artifact. Thus, locating various configurations that contain a same version of an artifact is possible. To change the artifact, a new version of the artifact (and/or parents of the artifact) can be created.

Several definitions that apply throughout this document will now be presented.

As used herein, the term "artifact" means a computer-based structure created for a practical purpose. An artifact can, for instance, comprise information (e.g., data) pertaining to a product (e.g., an article of manufacture, an application, a service, a system, or the like). Examples of an artifact include, but are not limited to, a product identification, a product specification, a drawing (e.g., a computer-aided design (CAD) drawing), a bill of materials, a procedure, computer-program code (e.g., a modules, routine, sub-routine, or the like), marketing material, and the like. Another example of an artifact is an artifact associated with one or more other artifacts, such as parent and/or child artifact.

In illustration, artifacts can be associated with one another in a hierarchy comprising a first parent artifact having one or more children artifacts, and one or more of the children artifacts themselves can be parent artifacts to other children artifacts. For example, a parent artifact can be a product identification, and the parent artifact can be associated with children artifacts corresponding to the product, for example a product specification, identifiers for components of the product (e.g., a bill of materials), drawings of the product, drawings of components of the product, etc. An artifact which is a parent to other artifacts also can be a child artifact to its parent artifact. For example, an artifact can be an identifier for a component of the product, and thus be a child artifact to the artifact representing the product, but also have children artifacts, for example drawings, specifications, etc. for the component, and children artifacts for sub-components of the component, and so on.

As used herein, the term "baseline" means a state of at least one version of an artifact in a particular immutable version.

As used herein, the term "immutable" means not changeable to a present version of an artifact. For example, if a first version of an artifact is immutable, a change to the first version of the artifact cannot be saved to that first version of the artifact. Instead, to save a change to the first version of the artifact, at least a second version of the artifact must be created to save the change. When an artifact is immutable, changes to children of the artifact also cannot be made without creating a new version of the artifact.

As used herein, the term "mutable" means changeable to a present version of an artifact. For example, if a first version of an artifact is mutable, changes may be made to that version without creating a new version of the artifact. Changes also may be made to children of the artifact. Moreover, children of the artifact can be disassociated from and the artifact and/or additional children can be associated with the artifact.

Figure 1:
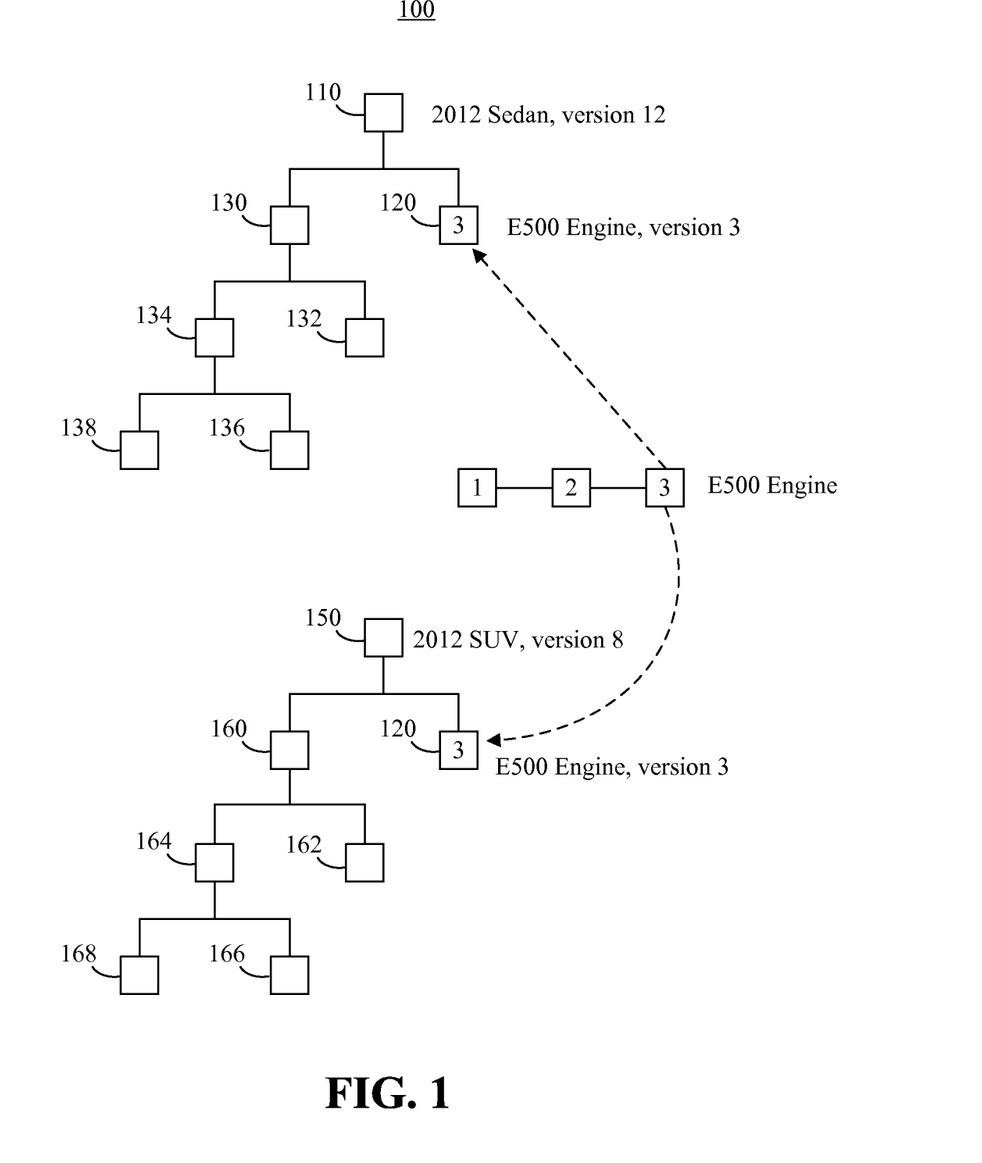
FIG. 1 is a block diagram illustrating components a system comprising a plurality of reusable artifacts in accordance with one embodiment disclosed within this specification.

FIG. 1 is a block diagram illustrating components 100 of a system comprising a plurality of reusable artifacts in accordance with one embodiment disclosed within this specification. Such artifacts, and their relationships, can be maintained by a suitable configuration management system.

The components 100 can include an artifact 110, which may be a parent artifact for a particular product (e.g., a 2012 Sedan, version 12), and various children artifacts 120, 130, 132, 134, 136, 138. In this example, the artifact 110 may represent an identity and/or a bill of materials for the 2012 Sedan, version 12. The artifact 120 may represent an E500 engine, version 3, used in the 2012 Sedan, version 12, and thus be a child artifact of the artifact 110. The artifacts 130-138 can represent any other suitable artifacts that are children artifacts of the artifact 110. Further, the artifact 130, though being a child of the artifact 110, can be a parent to the artifacts 132, 134, 136, 138. Similarly, the artifact 134, though being a child of the artifact 130, can be a parent to the artifacts 136, 138. In this regard, FIG. 100 presents the artifacts 110, 120, 130-138 in a hierarchy based on parent child relationships.

The components 100 also include an artifact 150, which may be a parent artifact for a particular product (e.g., a 2012 SUV, version 8), and various children artifacts 120, 160, 162, 164, 166, 168. In this regard, FIG. 100 presents the artifacts 150, 120, 160-168 in a hierarchy based on parent child relationships.

In this example, the artifact 150 may represent an identity and/or a bill of materials for the 2012 SUV, version 8. The artifacts 160-168 can represent any other suitable artifacts that are children artifacts to the artifact 110. The artifact 120 may represent the same E500 engine, version 3, used in the 2012 SUV, version 8, and thus not only be a child artifact of the artifact 150, but also be a child artifact to the artifact 110. In this regard, the artifact 120 can represent the same E500 engine used in the 2012 Sedan, version 12. Thus, both the artifact 110 and the artifact 150 can share, as a child artifact, the same artifact 120. Thus, the artifact 120 is a reusable artifact, being used both by the artifact 110 and the artifact 150. The artifact 120 can have associated therewith one or more children artifacts (not shown). By virtue of their association with the artifact 120, such other artifacts can be associated with the artifacts 110, 150, and thus also be considered to be reusable.

Figure 2:
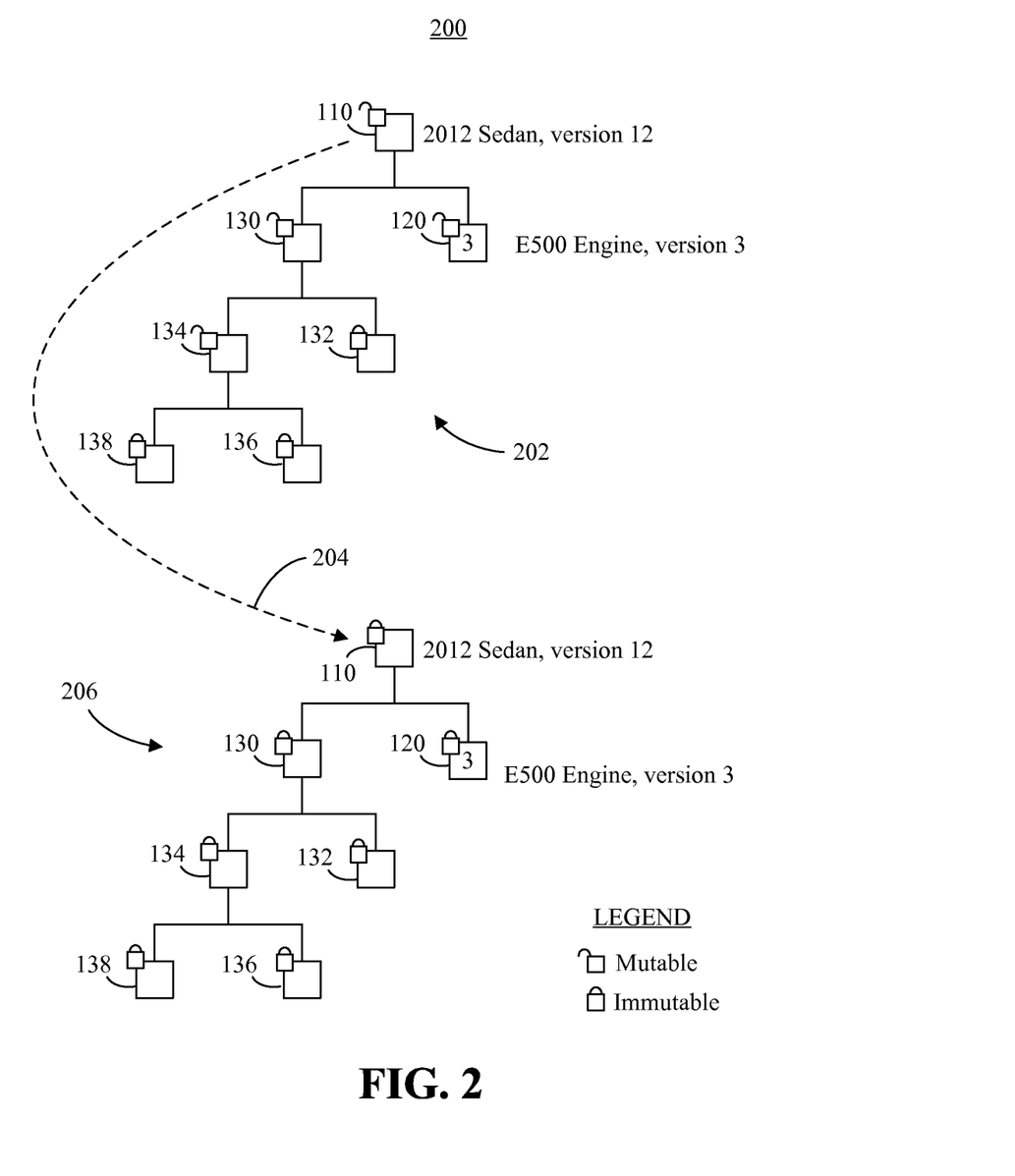
FIG. 2 is another block diagram illustrating components of the system comprising a plurality of reusable artifacts in accordance with one embodiment disclosed within this specification.

FIG. 2 is another block diagram illustrating components 200 of the system comprising a plurality of reusable artifacts in accordance with one embodiment disclosed within this specification. In this example, the artifacts 110, 120, 130, 134 may initially be mutable in a first version of the artifact 110. Other artifacts 132, 136, 138 may be immutable at this point, as shown in an upper portion 202 of FIG. 2. At some point in time, a user can select the artifact 110 to create an artifact baseline corresponding to the artifact 110 (e.g., for the 2012 Sedan, version 12), represented by the decision line 204. Responsive to the artifact baseline being created, via a processor, the artifact 110, as well as the artifacts 120, 130, 132, 134, can be made to be immutable, as shown in the lower portion 206 of FIG. 2. The artifacts 132, 136, 138 can remain immutable.

Figure 3:
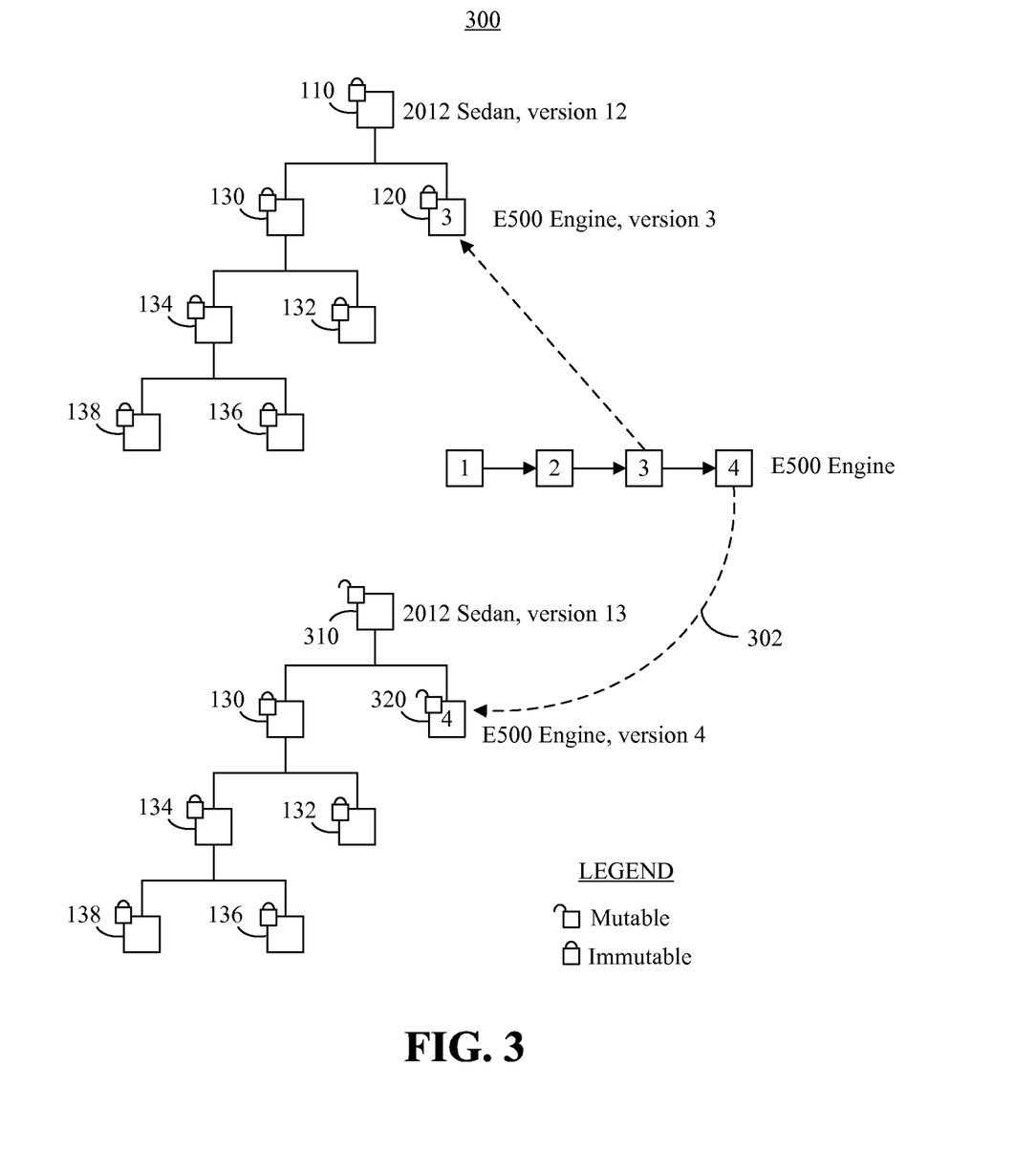
FIG. 3 is another block diagram illustrating components of the system comprising a plurality of reusable artifacts in accordance with one embodiment disclosed within this specification.

FIG. 3 is another block diagram illustrating components 300 of the system comprising a plurality of reusable artifacts in accordance with one embodiment disclosed within this specification. In this example, a user may choose to modify the artifact 120, which is immutable because it is included in a baseline for one or more products. For instance, a user may choose to revise the E500 engine, version 3, for example by checking out that artifact 120. After making changes to the artifact, the user may attempt to check back in the artifact 120 with the changes made by the user.

Since the artifact 120 is immutable, the user can be prompted to create a new version (e.g. version 4) of the E500 engine. If the user declines, the user's revisions need not be saved in the components 300. If, however, the user agrees to create the new version of the engine, a new version (e.g., version 4) can be automatically created and saved in the components 300, as represented by decision line 302. When this occurs, a new artifact 320 can be automatically created for the E500 engine, version 4, and can be automatically associated with a new artifact 310 created for, and associated with, the 2012 Sedan. In this regard, the changes creating the artifact 320 can be automatically cause the artifact 310 to be created, and the artifact can be automatically associated with (e.g., propagated) to the artifact 310.

The artifact 310 can be a parent artifact to the artifact 320. Since the engine has been revised, the artifact 310 can represent a new version of the 2012 sedan, for instance version 13. Also, the artifacts 310, 320 can be made mutable until a new baseline for the artifact 310 and/or artifact 320 is established. Nonetheless, all relationships between the artifacts 110, 120 and the artifacts 130-138 can be retained, and promulgated to, for the artifacts 310, 320. In other words, the artifacts 310, 320 can maintain the relationships with the artifacts 130-138 previously established by the artifacts 110, 120. Nonetheless, while the artifacts 310, 320 are mutable, children of the artifacts 310, 320 can be disassociated from the artifacts 310, 320, or additional children can be associated with the artifacts 310, 320, for example in response to one or more user inputs.

Further, referring to FIGS. 1 and 3, since the artifact 120 also is associated with the artifact 150 (e.g., for the 2012 SUV), when the artifact 120 is modified to create the artifact 320, a new version (not shown) of the artifact 150 also can be created, and that new version can be associated with the artifact 320. The new version of the artifact 150 also can be made mutable until a new baseline for that new version of the artifact 150 and/or the artifact 320 is created. Again, all relationships between the artifact 320, the new version of the artifact 150, and the artifacts 160-166 can be maintained. Nonetheless, while the new version of the artifact 150 is mutable, additional children can be associated with, or children can be disassociated from, the new version of the artifact 150.

Such operations can be transparent to the user. Accordingly, the user need only agree that the artifact be created and/or included in the components 300, and all processing to create the new version can be automatically implemented. Moreover, associations between respective versions can be automatically established. Thus, the user, or other users, easily can review the relationships between different versions of the artifacts to identify changes that were made.

To make changes to a particular artifact, such as the artifact 120, the artifact can be checked out of a configuration management system. Moreover, parent artifacts (e.g.

artifacts, 110, 150) also can be checked out. When the artifact (or the parent artifact 110, 150) is checked back in, the user can be prompted to choose whether to create a new version. If the user chooses to do so, the system can be updated as described. If the user chooses not to, the system need not be updated, and the artifact need not be implemented in the system. For example, the user can choose to keep the artifact as a work in progress without creating a new version that is applied in the system or establishing a new baseline. The user can check the artifact 120 back in, for example as the artifact 320, at any time desired by the user.

When a new baseline for the artifact 310 and/or artifact 320 is established, the components 300 can be automatically updated accordingly to make the artifact 310 and/or artifact 320 immutable as described with respect to FIG. 2. For example, the artifact 310 for the 2012 sedan, version 13, can be established. Further, referring to FIG. 1, the artifact 120 associated with the artifact 150 for the 2012 SUV can be automatically updated with the E500 engine, version 4, and the artifact 150 for the 2012 SUV can be automatically updated to version 9, representing the inclusion of the updated E500 engine.

Figure 4:
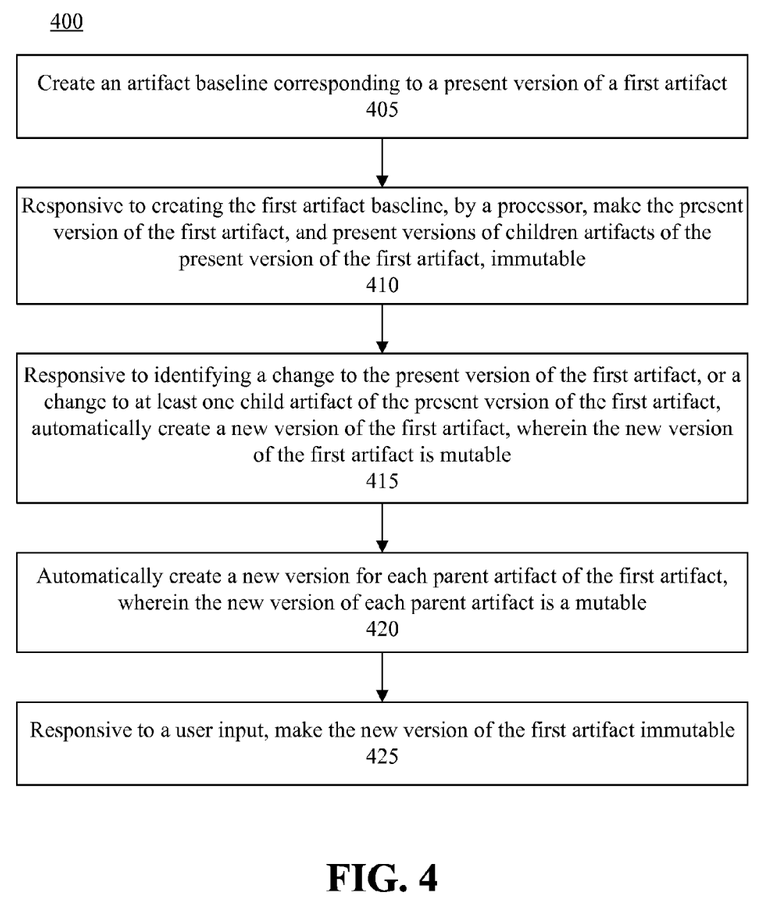
FIG. 4 is a flow chart illustrating a method of versioning configurations of reusable artifacts in accordance with another embodiment disclosed within this specification.

FIG. 4 is a flow chart illustrating a method 400 of versioning configurations of reusable artifacts in accordance with another embodiment disclosed within this specification. At step 405, an artifact baseline corresponding to a present version of a first artifact can be created. At step 410, responsive to creating that artifact baseline, by a processor, the present version of the first artifact, and present versions of children artifacts of the present version of the first artifact, can be made immutable.

At step 415, responsive to identifying a change to the present version of the first artifact, or a change to at least one child artifact of the present version of the first artifact, a new version of the first artifact can be automatically created, wherein the new version of the first artifact is mutable. At step 420, a new version for each parent artifact of the first artifact can be automatically created, wherein the new version of each parent artifact is mutable. At step 425, responsive to a user input, the new version of the first artifact can be made immutable. Further, each child artifact of the new version of the first artifact also can be made immutable. For example, a new artifact baseline corresponding to the new version of the first artifact can be created. In response to the artifact baseline being created, the new version of the first artifact, and its children artifacts, can be made immutable.

Figure 5:
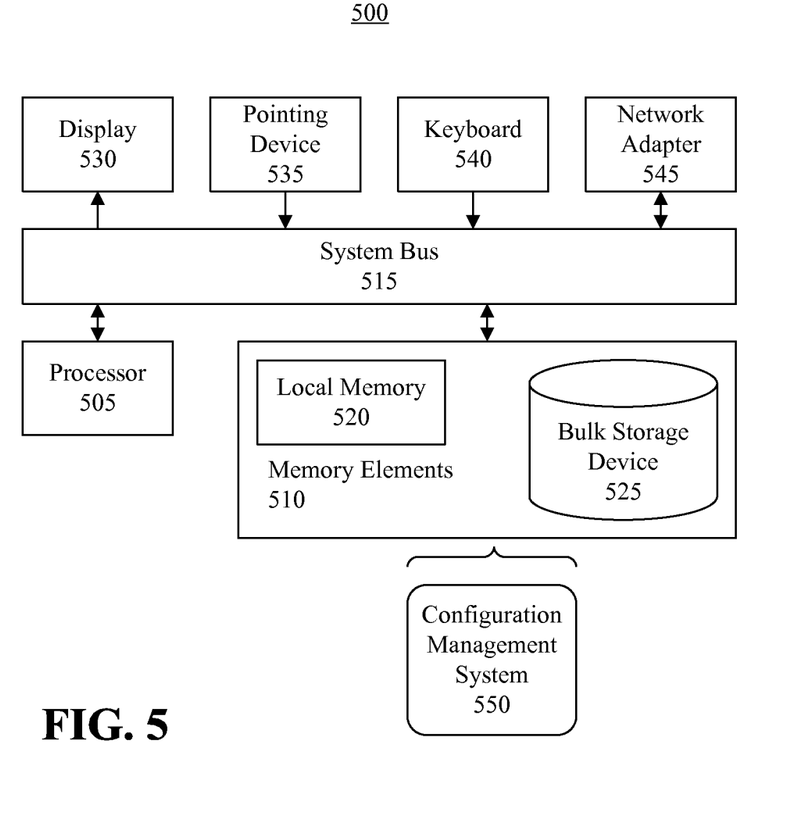
FIG. 5 is a block diagram illustrating a processing system for versioning configurations of reusable artifacts in accordance with one embodiment disclosed within this specification.

FIG. 5 is a block diagram illustrating a processing system 500 for versioning configurations of reusable artifacts in accordance with one embodiment disclosed within this specification.

The processing system 500 can include at least one processor 505 (e.g., a central processing unit) coupled to memory elements 510 through a system bus 515 or other suitable circuitry. As such, the processing system 500 can store program code within the memory elements 510. The processor 505 can execute the program code accessed from the memory elements 510 via the system bus 515. It should be appreciated that the processing system 500 can be implemented in the form of any system including a processor and memory that is capable of performing the functions and/or operations described within this specification. For example, the processing system 500 can be implemented as a computer (e.g., a server, a workstation, a mobile computer, a laptop computer, a tablet computer, or the like), a computing appliance, and so on.

The memory elements 510 can include one or more physical memory devices such as, for example, local memory 520 and one or more bulk storage devices 525. Local memory 520 refers to RAM or other non-persistent memory device(s) generally used during actual execution of the program code. The bulk storage device(s) 525 can be implemented as a hard disk drive (HDD), solid state drive (SSD), or other persistent data storage device. The processing system 500 also can include one or more cache memories (not shown) that provide temporary storage of at least some program code in order to reduce the number of times program code must be retrieved from the bulk storage device 525 during execution.

Input/output (I/O) devices such as a display 530, a pointing device 535 and, optionally, a keyboard 540 can be coupled to the processing system 500. The I/O devices can be coupled to the processing system 500 either directly or through intervening I/O controllers. For example, the display 530 can be coupled to the processing system 500 via a graphics processing unit (GPU), which may be a component of the processor 505 or a discrete device. One or more network adapters 545 also can be coupled to processing system 500 to enable processing system 500 to become coupled to other systems, computer systems, remote printers, and/or remote storage devices through intervening private or public networks. Modems, cable modems, transceivers, and Ethernet cards are examples of different types of network adapters 545 that can be used with processing system 500.

As pictured in FIG. 5, the memory elements 510 can store a configuration management system 550 that performs the processes and methods described herein. Being implemented in the form of executable program code, the configuration management system 550 can be executed by the processing system 500 and, as such, can be considered part of the processing system 500. Moreover, the configuration management system 550 is a functional data structure that imparts functionality when employed as part of the processing system 500 of FIG. 5.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A system comprising:
a processor programmed to initiate executable operations comprising:
creating, from a present version of a first artifact which is mutable, an artifact baseline corresponding to the present version of a first artifact;
responsive to creating the artifact baseline, making the present version of the first artifact, and present versions of children artifacts of the present version of the first artifact, immutable; and
responsive to identifying a user request to check-in the present version of the first artifact with at least one change made to the present version of the artifact, automatically creating a new version of the first artifact including the at least one change, wherein the new version of the first artifact is mutable, and saving the new version of the artifact.

2. The system of claim 1, the executable operations further comprising:
automatically creating a new version for each parent artifact of the first artifact, wherein the new version of each parent artifact is mutable.

3. The system of claim 2, the executable operations further comprising:
associating the new version of the first artifact with the new version of each parent of the first artifact.

4. The system of claim 1, wherein creating the new version of the first artifact comprises:
creating the new version of the first artifact to retain all relationships established between the present version of the first artifact and all other artifacts with which the present version of the first artifact is associated.

5. The system of claim 1, the executable operations further comprising:
responsive to a user input, associating at least one child artifact with, or disassociating at least one child artifact from, the new version of the first artifact when the new version of the first artifact is mutable.

6. The system of claim 1, the executable operations further comprising:
responsive to a user input, creating a new artifact baseline corresponding to the new version of the first artifact; and
responsive to creating the new artifact baseline, making the new version of the first artifact immutable.

7. The system of claim 6, the executable operations further comprising:
responsive to creating the new artifact baseline, making each child artifact of the new version of the first artifact immutable.

8. A computer program product for versioning configurations of reusable artifacts, the computer program product comprising a computer readable storage medium having program code stored thereon, the program code executable by a processor to perform a method comprising:
creating, by the processor, from a present version of a first artifact which is mutable, an artifact baseline corresponding to the present version of a first artifact;
responsive to creating the artifact baseline, by the processor, making the present version of the first artifact, and present versions of children artifacts of the present version of the first artifact, immutable; and
responsive to identifying a user request to check-in the present version of the first artifact with at least one change made to the present version of the artifact, automatically creating, by the processor, a new version of the first artifact including the at least one change, wherein the new version of the first artifact is mutable, and saving the new version of the artifact.

9. The computer program product of claim 8, the method further comprising:
automatically creating, by the processor, a new version for each parent artifact of the first artifact, wherein the new version of each parent artifact is mutable.

10. The computer program product of claim 9, the method further comprising:

associating, by the processor, the new version of the first artifact with the new version of each parent of the first artifact.

11. The computer program product of claim 8, wherein creating the new version of the first artifact comprises:
creating the new version of the first artifact to retain all relationships established between the present version of the first artifact and all other artifacts with which the present version of the first artifact is associated.

12. The computer program product of claim 8, the method further comprising:
responsive to a user input, by the processor, associating at least one child artifact with, or disassociating at least one child artifact from, the new version of the first artifact when the new version of the first artifact is mutable.

13. The computer program product of claim 8, the method further comprising:
responsive to a user input, by the processor, creating a new artifact baseline corresponding to the new version of the first artifact; and
responsive to creating the new artifact baseline, by the processor, making the new version of the first artifact immutable.

14. The computer program product of claim 13, the method further comprising:
responsive to creating the new artifact baseline, by the processor, making each child artifact of the new version of the first artifact immutable.

\* \* \* \* \*